Dec. 11, 1928.
P. ACKERMAN
ELECTRIC COOKER
1,694,762
Filed April 19, 1927   3 Sheets-Sheet 1
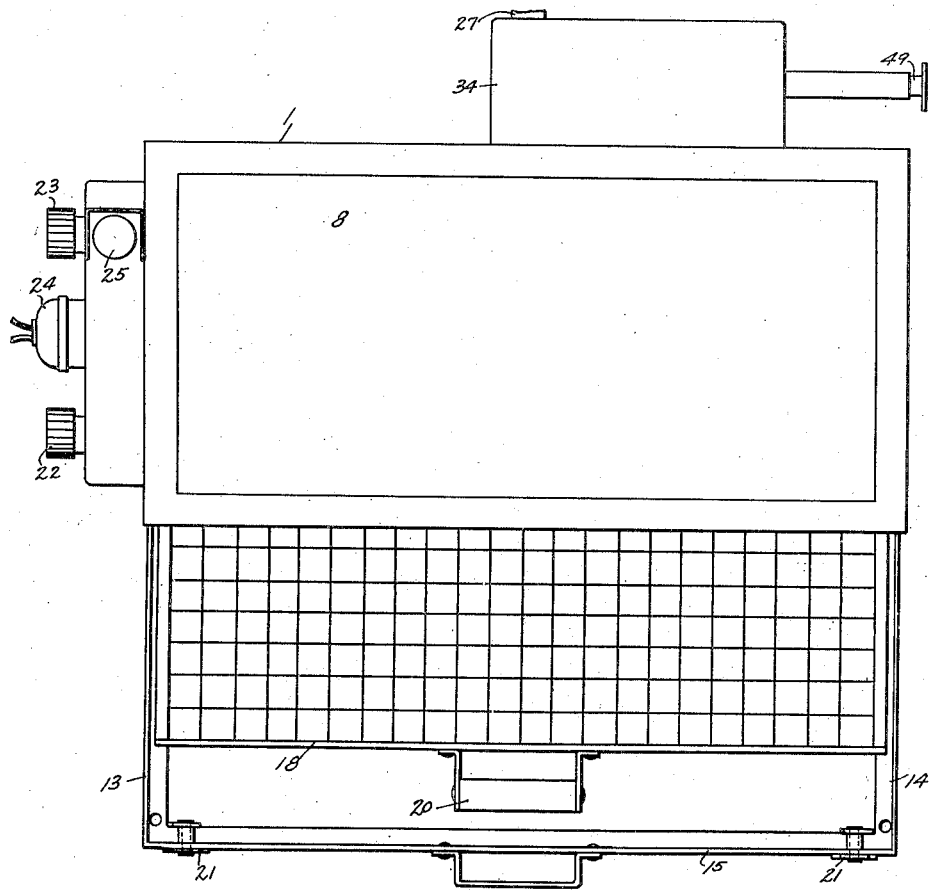
Fig. I
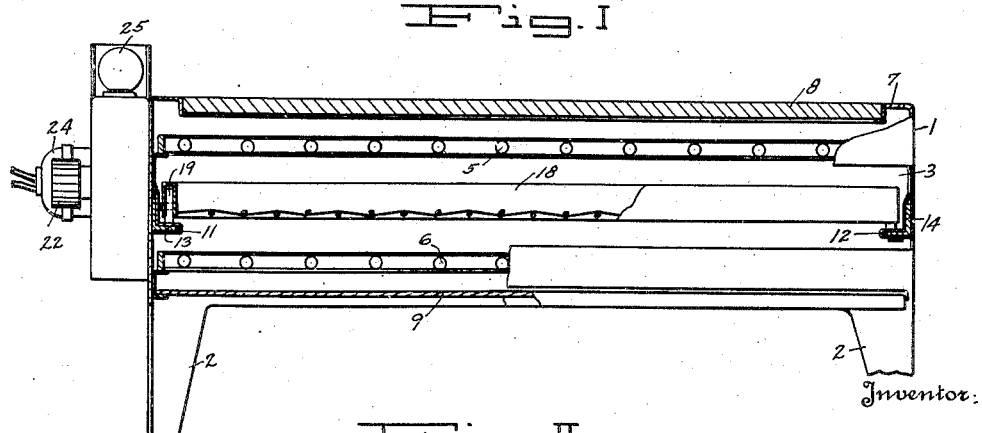
Fig. II
Inventor:
Peter Ackerman,
By Atkins & Atkins,
Attorneys.

Dec. 11, 1928.
P. ACKERMAN
1,694,762
ELECTRIC COOKER
Filed April 19, 1927  3 Sheets-Sheet 2
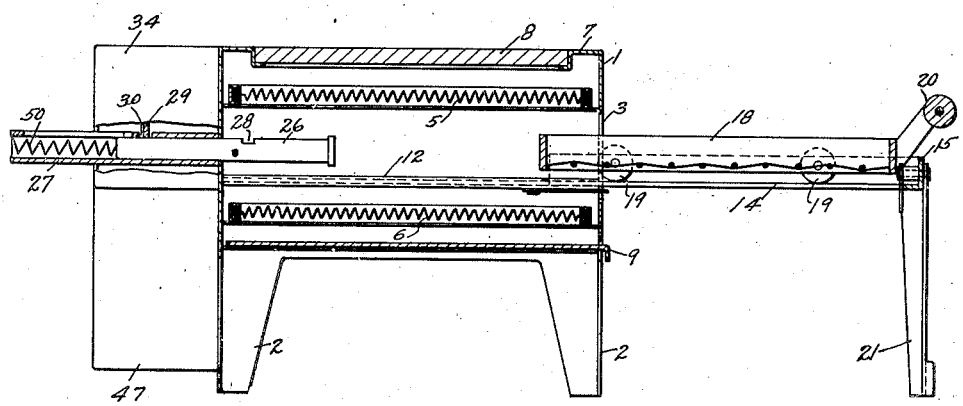
Fig. III
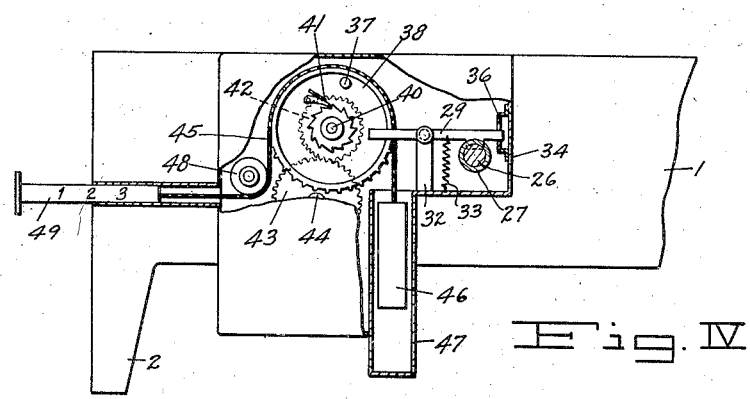
Fig. IV
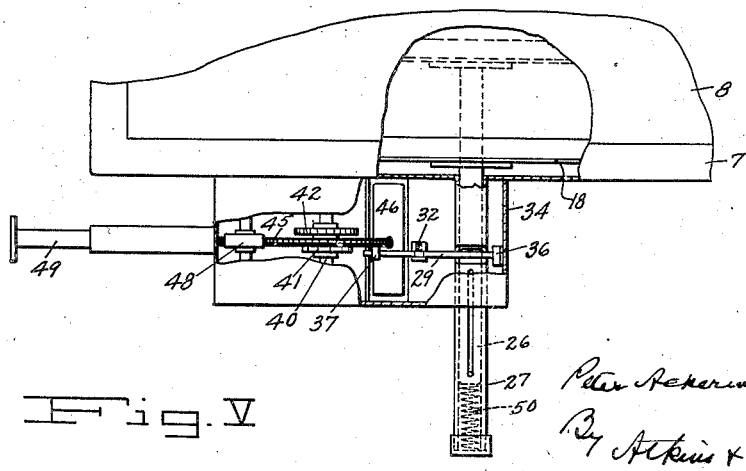
Fig. V
Inventor:
Peter Ackerman,
By Atkins & Atkins
Attorneys.

Dec. 11, 1928.
P. ACKERMAN
ELECTRIC COOKER
Filed April 19, 1927  3 Sheets-Sheet 3
1,694,762
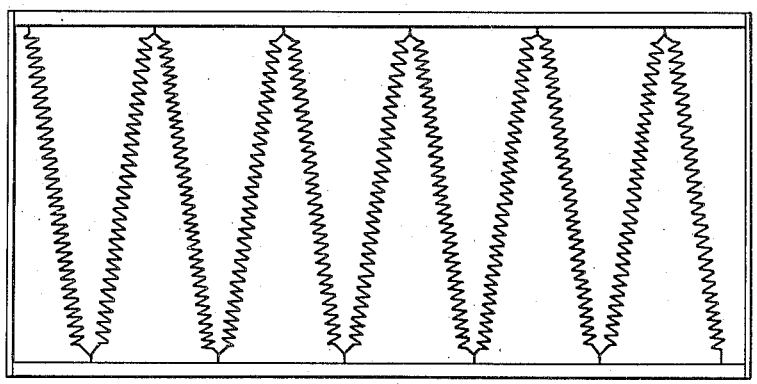
Fig. VI
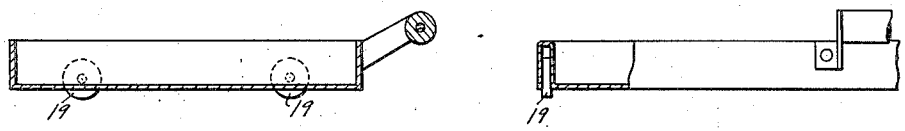
Fig. VII  Fig. VIII
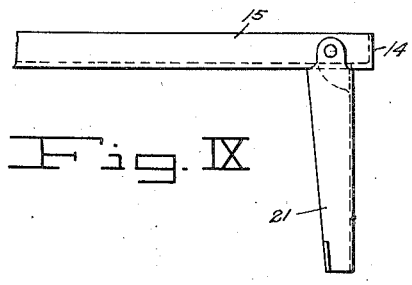
Fig. IX
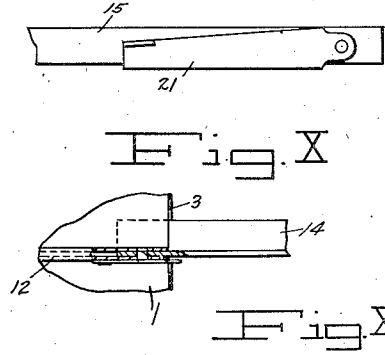
Fig. X
Fig. XI
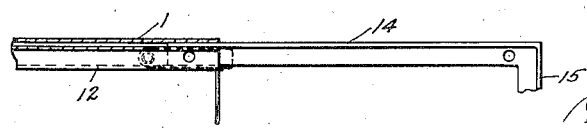
Fig. XII
Inventor:
Peter Ackerman,
By Atkins & Atkins
Attorneys.

Patented Dec. 11, 1928.

1,694,762

UNITED STATES PATENT OFFICE.

PETER ACKERMAN, OF WASHINGTON COUNTY, OREGON, ASSIGNOR OF ONE-HALF TO JOHN A. SUSBAUER, OF PORTLAND, OREGON.

ELECTRIC COOKER.

Application filed April 19, 1927. Serial No. 184,984.

My invention relates to electric cookers, including toasters, and has for its principal object the production of a cooker in which the article to be cooked or toasted is first subjected to cooking heat for a predetermined period, and is afterwards automatically relieved from the effective operation of said heat, preferably by the bodily movement of said article out of the range of said heat.

What constitutes my invention will be hereinafter described in detail and succinctly defined in the appended claims.

In the accompanying drawings, wherein I illustrate my invention in its present preferred form of embodiment, Figure I is a top plan view of my cooker complete, showing in the non-cooking position, the movable supporting member for an article to be cooked.

Figure II is a front elevation of the subject matter of Figure I, partly in section and partly broken away.

Figure III is a view similar to Figure II, but taken at right angles thereto.

Figure IV is a similar view showing, substantially in longitudinal elevation, the interior mechanism for imparting motion to the movable supporting member shown in Figures I and III.

Figure V is a similar top plan view of the subject matter of Figure IV.

Figure VI is a plan view of one of the electrical heating elements of my device detached.

Figure VII is a transverse section of one form of the article supporting member detached.

Figure VIII is a similar view of one half of the subject matter of Figure VII taken at right angles thereto.

Figure IX is a front elevation detached of the outer end of the platform for the article supporting member as shown in Figure III in operative position, with said supporting member removed.

Figure X is a view similar to Figure IX but showing the supporting leg of the platform folded against the same to permit the retreat of the platform into the body of the device.

Figure XI is a detail partly sectional side view of a preferred form of frictional connection between one rail of the platform aforesaid and the frame of the device.

Figure XII is a view similar to Figure XI showing the frictional connection in top plan.

Referring to the numerals on the drawings, 1 indicates the body of a frame of any suitable shape, preferably of the general rectangular shape illustrated, and constructed of any dimensions and suitable material desired, and which is preferably supported on four legs 2. The body 1 is preferably a box-like structure that is partly open on one side, as indicated at 3. Within the body 1, I provide an upper fixed electric heating element 5 and a corresponding lower fixed element 6, enclosed above and below by a top 7 preferably having a countersunk cooking plate 8, and a bottom plate 9.

Between the heating elements 5 and 6, I provide sufficient space for the operative accommodation of parallel track-rails 11 and 12 fixed to the body 1, and for a movable extension track frame consisting preferably of side rails 13 and 14 which are in vertical alinement with the track rails 11 and 12, respectively, and having in front a transverse cross piece 15 which unites the rails 13 and 14 into a stiff rigid frame.

The movable extension track frame is operatively connected with the track rails 11 and 12 by a slidable connection, shown in preferred frictional form in Figures XI and XII. The faces of the track rails 11 and 12 are in substantially horizontal alignment with the rails 13 and 14, respectively, and serve as a support for a tray or movable supporting member 18 for an article to be cooked which is carried by the rails in operative proximity to the two heating elements 5 and 6, between which it is adapted to reciprocate as occasion requires. The said movable supporting member 18 is represented in Figures I to III of the drawings by a toaster-frame and is provided with antifriction wheels 19 that enable it to move freely on track rails 11—14, and with a handle 20 by aid of which it may be manipulated.

In Figures VII and VIII the member 18 is shown as a frying pan.

The movable extension track frame is provided at its front side with legs 21 at its opposite corners, the said legs being of folding construction so that when they are folded as shown in Figure X the said frame may be, in effect, encased within the space provided for it in the body 1.

The heating elements, 5 and 6, are in use electrically energized, independently, through respective electrical switches 22 and 23, each operatively communicating independently with a source of electrical supply, indicated by an ordinary socket 24. A lamp 25 is preferably employed in circuit with the heating elements to indicate when the electric current is on or off.

The elements 5 and 6, or either of them if desired, serve not only to heat the cooking plate 8, but also to heat articles to be cooked supported on the frame 18 or other movable supporting member.

Automatic mechanism is provided for re-relieving the contents of the frame 18 from the effective operation of heat of the heating elements 5 and 6. This result is accomplished preferably by driving the frame 18 outwardly upon the rails 13 and 14 to a position at rest outside of the effective range of heat of the elements 5 and 6.

Said automatic mechanism consists preferably of a plunger 26 that is carried in a case 27 (compare Figures III, IV, and V) and provided with a notch 28 wherewith a stop lever 29 effects engagement through an aperture 30 in the case 27, said lever being fulcrumed as to a standard 32 secured to a case 34 provided for said automatic mechanism, and being actuated in one direction by a tension spring 33 secured to it at one end and at the other to the floor of the case 34.

A stop hood 36 on the case 34 engages one end of the lever 29, to limit its vibration, while the other end of the lever 29 extends across the path of movement of a pin 37 which projects from one side of a sprocket wheel 38 mounted on an arbor 40, with an intermediate pawl and ratchet connection 41.

To the arbor 40 is also fastened a spur gear 42 which intermeshes with a gear 43 that representatively indicates suitable time mechanism, in that it is fastened to a shaft 44 whose movement is controlled and timed by the rotation of said shaft.

A sprocket chain 45 is bent about the sprocket wheel 38, into engagement with which it is compelled by a weight 46 attached to it at one end and preferably encased within a well 47. A guide wheel 48 is effectively interposed between the sprocket wheel 38 and a setting pin plunger 49 to which the end of the sprocket chain 45 that is opposite the weight 46 is attached, and which preferably displays time markings "1," "2," "3," as shown in Figure IV.

Said markings indicate conventionally different timing intervals for cooking operation, which may be varied at will as to duration or number. The plunger 26 is preferably actuated by a coiled spring 50, confined within the case.

The operation of my device may be briefly described as follows.

The apparatus is set up as shown in Figure III, and, electric energy being supplied, as through the socket connection 24, the tray 18 is drawn out so as to be supported upon the rails 13 and 14.

The tray is then loaded with an article to be cooked, say for example a slice of bread to be toasted. Then the tray is, by the aid of its handle 20, pushed into the space provided for it in the body 1 until the inner side of the tray impinges against the end of the plunger 26. Thereupon, the plunger 26 retreats under continued pressure applied against the resistance of the spring 50, until the lever 29 engages the notch 28. At that time the limit of inward movement of the plunger 26 is reached, and the plunger is held in position at said limit so long as engagement between the lever 29 and the notch 28 continues.

While said engagement continues the contents of the tray 18 is subjected to cooking heat, which continues for the period to which the pin plunger 48 is set. When that period is completed, the plunger 26 is released through tripping engagement of the pin 37 with the lever 29, and shooting forward under impulse of its spring 33, drives the tray 18 before it.

What I claim is:

1. An electric cooker, consisting of the combination with a frame, and electric heating means operatively carried thereby, of rails extending from within the frame to the outside thereof, a movable supporting member carried on said rails, and automatic means for driving said member from the frame along the rails after a predetermined period of time.

2. An electric cooker, consisting of the combination with a frame, and electric heating means operatively carried thereby, of rails extending from within the frame to the outside thereof, a movable supporting member carried on said rails, and time mechanism for setting said automatic means into operation.

3. An electric cooker, consisting of the combination with a frame, and a plurality of electric heating elements operatively carried thereby, of rails extending between said elements from within the frame to the outside thereof, a movable supporting member carried on said rails, and automatic means for driving said member from the frame along the rails after a predetermined period of time.

4. An electric cooker, consisting of the combination with a frame, and a plurality of electric heating elements operatively carried thereby, of rails extending between said elements from within the frame to the outside thereof, a movable supporting member carried on said rails, and automatic means for driving said member from the frame along the rails after a predetermined period of time, said mechanism comprising a gear intermeshing with a sprocket wheel carried by an arbor provided on the frame and connected with the arbor in effect by a pawl and ratchet connection, a sprocket chain counterweighted at one end in mesh with the sprocket wheel and fastened at the other end to a setting pin plunger, a spring actuated plunger in operative driving disposition to the movable supporting member aforesaid, a spring-actuated stop lever adapted to arrest the movement of the spring-actuated plunger, and means for effecting tripping engagement between the sprocket wheel and the stop lever adapted to release the spring-actuated plunger at a time predetermined by the selected initial position of the setting pin plunger and the movement of the time mechanism.

5. An electric cooker, consisting of the combination with a frame, and electric heating means operatively carried thereby, of rails extending from within the frame to the outside thereof, a movable supporting member carried on said rails, and automatic means for driving said member from the frame along the rails after a predetermined period of time, said rails being extensible by side rails of an extension track frame that is slidably united to the rails first named.

6. An electric cooker, consisting of the combination with a frame, and electric heating means operatively carried thereby, of rails extending from within the frame to the outside thereof, a movable supporting member carried on said rails, and automatic means for driving said member from the frame along the rails after a predetermined period of time, said rails being extensible by side rails of an extension track frame that is slidably united to the rails first named, said extension track frame being provided with folding legs for the purpose specified.

In testimony whereof, I have hereunto set my hand.

PETER ACKERMAN.